United States Patent [19]

Thurenius

[11] Patent Number: 4,607,910
[45] Date of Patent: Aug. 26, 1986

[54] OPTICAL FIBER SWITCH HAVING A MOVABLE FIBER SECURED TO A SLIDE WHICH IS INDIRECTLY MOVED BY A MAGNETIC ARMATURE

[75] Inventor: Åke G. H. Thurenius, Skärholmen, Sweden

[73] Assignee: Telefonaktiebolaget LM Ericsson, Stockholm, Sweden

[21] Appl. No.: 740,266

[22] PCT Filed: Sep. 25, 1984

[86] PCT No.: PCT/SE84/00308
§ 371 Date: May 22, 1985
§ 102(e) Date: May 22, 1985

[87] PCT Pub. No.: WO85/01803
PCT Pub. Date: Apr. 25, 1985

[30] Foreign Application Priority Data

Oct. 14, 1983 [SE] Sweden ................................ 8305653

[51] Int. Cl.⁴ ................................................ G02B 6/36
[52] U.S. Cl. ................................................ 350/96.20
[58] Field of Search .......................... 350/96.15, 96.20

[56] References Cited

U.S. PATENT DOCUMENTS

| | | | |
|---|---|---|---|
| 4,318,587 | 3/1982 | Grassl | 350/96.2 |
| 4,337,995 | 7/1982 | Tanaka et al. | 350/96.2 |
| 4,415,228 | 11/1983 | Stanley | 350/96.2 |
| 4,415,229 | 11/1983 | McCullough | 350/96.2 |
| 4,452,507 | 6/1984 | Winzer | 350/96.2 |

Primary Examiner—John Lee
Assistant Examiner—Lester E. Rushin
Attorney, Agent, or Firm—Roberts, Spiecens & Cohen

[57] ABSTRACT

An optical fiber switch comprising a fixed holder supporting a plurality of parallel fibers and a slide supporting a plurality of movable fibers having ends facing the ends of the fixedly mounted fibers. The slide is movable between first and second abutments in response to the activation of a magnetically activated armature. A first spring acts on the slide to displace it from the first abutment to the second abutment and a second stronger spring acts on the slide in opposition to the first spring. The armature carries an armature bracket which bears against the second spring to displace the second spring away from the slide when the armature is activated in order to diminish the action of the second spring so that the slide is displaced to the second abutment substantially only under the action of the first spring.

8 Claims, 7 Drawing Figures

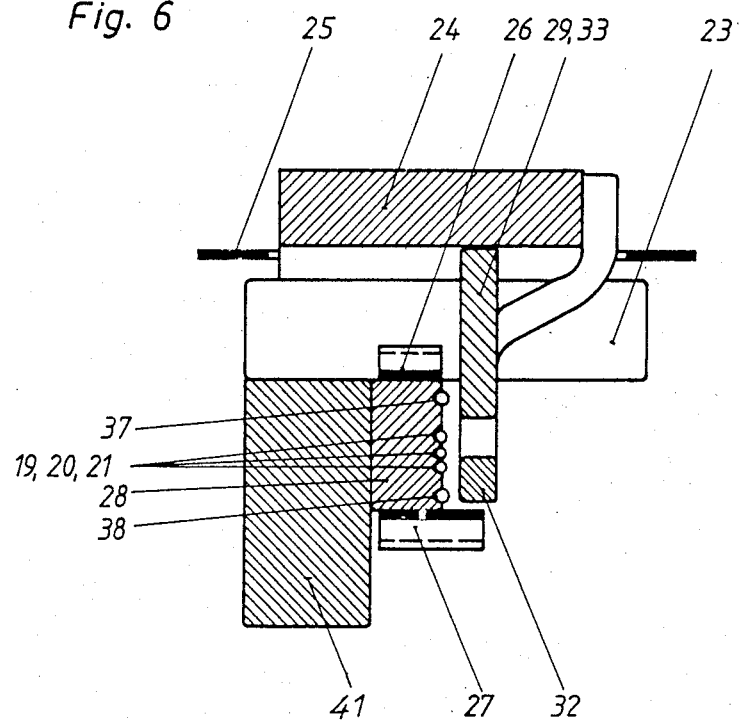

OPTICAL FIBER SWITCH HAVING A MOVABLE FIBER SECURED TO A SLIDE WHICH IS INDIRECTLY MOVED BY A MAGNETIC ARMATURE

FIELD OF THE INVENTION

The present invention relates to an optical fibre switch containing optical fibre conductors for switching optical signals from a first plurality of parallel fibres to a second plurality of parallel fibres. Such a switch may be used as a relay, for example, in a loop system at the connection point between the fibre loop and the bus terminal.

BACKGROUND

In optical fibre switch described in the Swedish patent application No. 8204085.8 there is shown a movable slide to which the optical fibres are attached. The fibres run parallel to a fixed holder in the switch. Fibre ends having the same properties and dimensions as those in the movable slide are fixedly arranged at the switching point. The movable slide is actuated by a movable armature in an electromagnetic iron circuit for providing the switching action, and the movable slide is returned to its neutral position in an unactuated state by a return spring.

SUMMARY OF THE INVENTION

In the known switch, direct actuation of the movable slide is achieved by an actuation arm provided with a spring tongue moving the slide under the action of a magnetic force from one position to the other. In practice there are problems with this direct actuation, however, since the tongue of the actuating arm should be stiff at the beginning of the movement but weak at the end of it to withstand pressure without the action of an unnecessarily large magnetic force.

The object of the present invention is to solve the above-mentioned problem by providing an actuation means in an optical fibre relay which has an indirect action on the movable slide.

In accordance with the invention there is provided an optical fiber switch comprising a fixed holder, at least one fixedly mounted fiber on said holder, a slide, at least one movable fiber secured to said slide in facing relation to said fixedly mounted fiber, first and second abutments between which said slide is movable, and means including a magnetically activated armature for displacing said slide to selectively and controllably couple and uncouple said fibers optically, said means including a rigidly clamped first spring acting on said slide to displace the slide from said first abutment to said second abutment, a second spring acting on said slide in opposition to said first spring, said second spring being stronger than said first spring, and means rigidly mounted on said armature for diminishing the action of said second spring on said slide, upon activation of said armature, so that said slide is displaced to said second abutment substantially only under the action of said first spring.

BRIEF DESCRIPTION OF THE DRAWINGS

The invention will now be described in detail with reference to the accompanying drawings, in which:

FIG. 6 is a sectional view taken along line 4—4 in FIG. 5.

DETAILED DESCRIPTION OF BEST MODES FOR CARRYING OUT THE INVENTION

Figure 1:
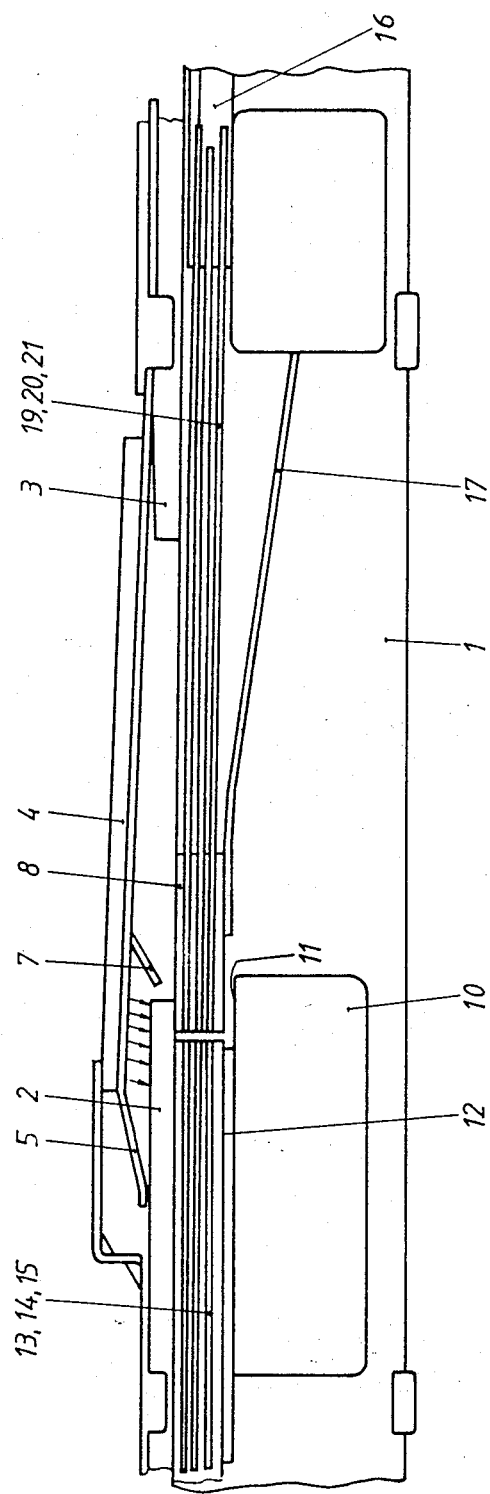
FIG. 1 shows a known optical fibre switch in accordance with the above mentioned Swedish patent application, FIGS. 2A and 2B diagrammatically illustrate optical fibers of the switch for two respective positions.

FIG. 1 shows the optical fibre switch according to the above mentioned Swedish patent application, in the form of a relay. The relay is constructed on a bottom plate 1 along the long side of which two iron cores 2 and 3 are attached. An armature 4 of soft, magnetic material is attached to an armature spring 5. Magnetic flux is generated in a manner known per se, with the aid of an unillustrated coil which magnetizes an iron circuit in which the magnetic cores 2, 3 and the armature 4 are included.

A holder 12 is attached to the bottom plate. The holder has three optical fibres 13, 14 and 15 fixed thereon. A movable slide 8 can move in a movement substantially perpendicularly to the longitudinal direction of the fibres 13, 14, 15. Three optical fibres 19, 20 and 21 are fixed to the slide 8. These fibres extend to the right in the figure, past the right end edge of the slide, and are anchored in a fixed holder 16. A return spring 17 keeps the movable slide 8 in place in its starting position in which the slide is pressed against the core 2. On magnetizing, the movable slide is moved into engagement with the guide plate 10 against the surface 11 thereof.

In the described relay, as well as in similar structures for optical fibre switching, it is normal that the armature 4 directly actuates the movable slide. When a armature 4, on operation, moves towards the core 2, the spring tongue 7 will approach the movable slide 8 and when the tongue meets the slide the tongue will first flex a given distance in response to the inertia of the slide 8 and the spring bias in the return spring 7, and will substantially begin to push the movable slide 8 until the latter is stopped by the surface 11. When the armature 4 then continues its movement into full engagement against the core 2, the spring tongue 7 is forced to deflect further.

In an optical fibre relay for switching, the movement of the fibre carrying slide will be determined by the spacing between the fibres.

Figure 2A:
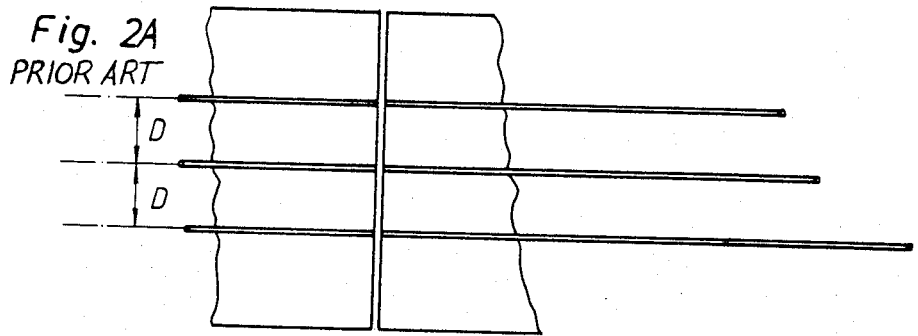
Figure 2B:
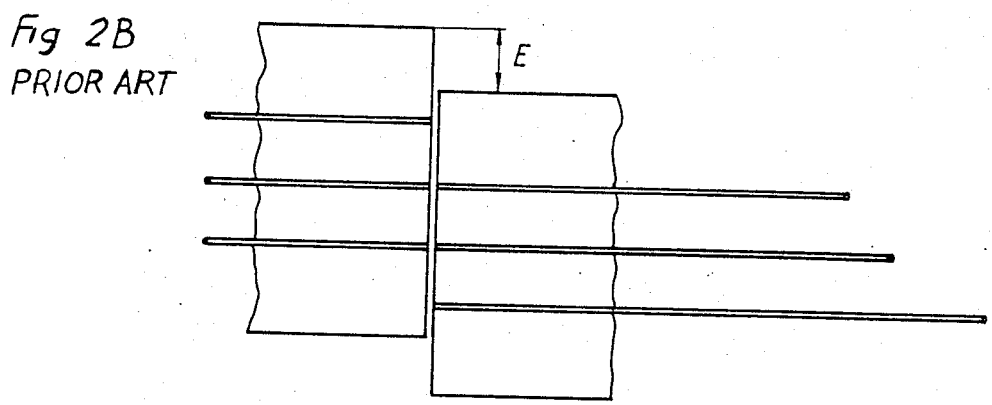
Figure 3:
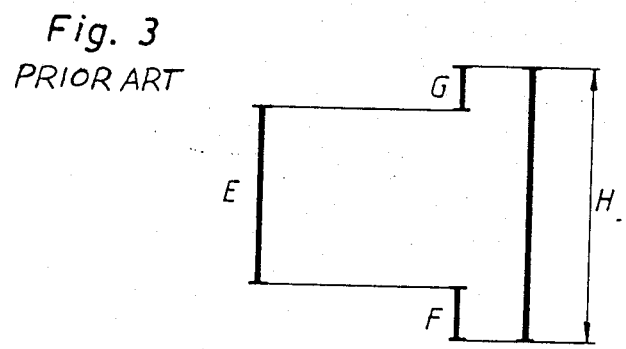
FIG. 3 is a schematic diagram of the slide movement.

For the known relay according to the above, FIG. 2 illustrates the spacing D and the distance E which the movable slide moves when the relay is operated, and the distance E must in principle be equal to D in order that the center lines of the fibres will coincide before and after the movement. FIG. 3 schematically illustrates the distance E and the distance the armature suitably moves, namely H, which is equal to E+F+G, where the additional distance F designates play or lost motion in the armature before the movable slide is actuated. The distance F may be said to be necessary to allow armature bounce when the relay is released without affecting the slide giving the optical connection. The distance G is the play or lost motion of the armature in the make state which ensures that minor dimensional inaccuracies do not affect the optical connection. The distances G and F contribute to the reliable function of the relay, and in practice they are small in relation to the necessary movement E.

Some form of spring means must be employed to provide the lost motions corresponding to distances G and F for a directly actuating armature. In FIG. 1, this spring means is the spring tongue 7. In a practical embodiment there is an opposed relationship, however, since the tongue 7 should be stiff at the beginning of the movement so that the lost motion corresponding to F will not be large and thus require a large armature stroke. On the other hand, at the termination of the stroke, the tongue should be weak, so as to withstand pressure without the force increasing too much. The present invention has been conceived to solve this problem.

Figure 4:
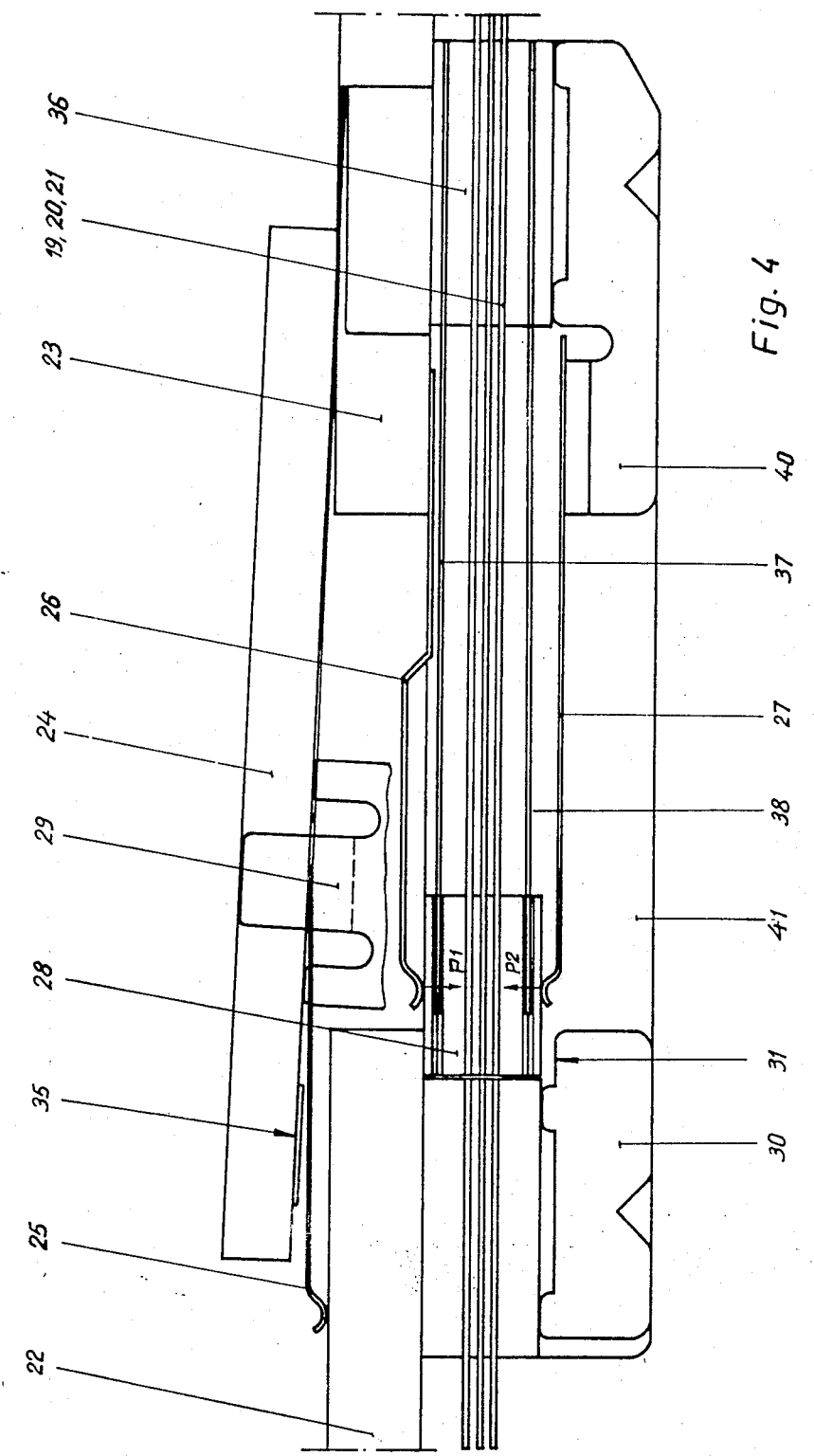
FIG. 4 shows a switch with indirect actuation in accordance with the present invention.
Figure 5:
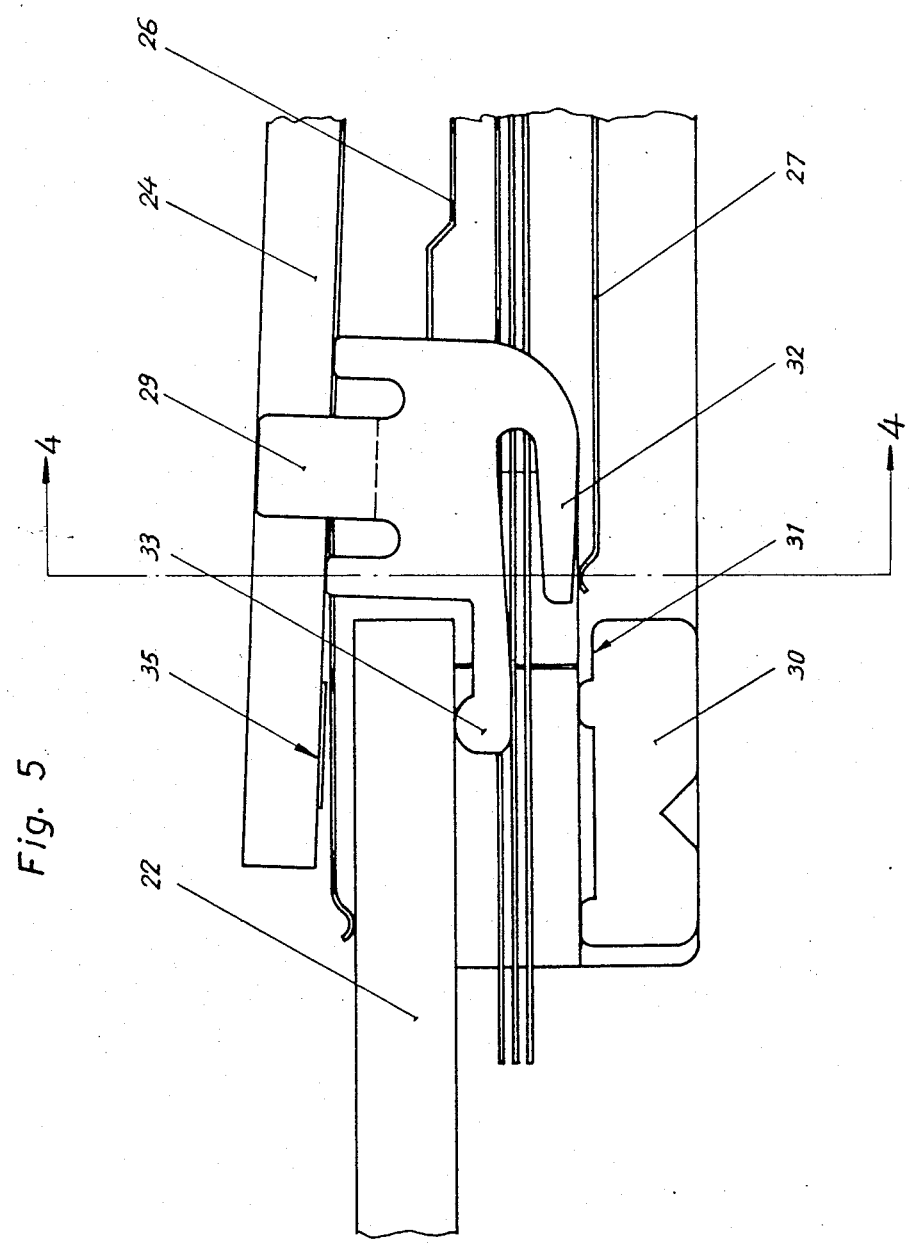
FIG. 5 is the detail view of a switch with indirect actuation according to FIG. 4.

An indirect operating optical fibre switch, in accordance with the invention, is illustrated in FIGS. 4, 5 and 6. A make spring 26 attached to a core 23 is biassed so that it applies to the movable slide 28, corresponding to the slide 8 in the known relay, a force $P_1$ of the order of magnitude 150 mN. A break spring 27 attached to a guide plate 40 is biassed so that it applies to the movable slide 28 a force $P_2$ of the order of magnitude 300 mN. The resultant $P_2-P_1$ will be about 150 mN and constitutes the force which in a release state keeps the movable slide 28 against a core 22 corresponding to the core 2 in FIG. 1.

The complete appearance of the armature bracket 29 is illustrated in FIGS. 5 and 6, this only being partially apparent from FIG. 4. In FIG. 5, the armature 24 is provided with the armature bracket 29 which upon the make action acts on the break spring 27, via an adjustable tongue 32, thus moving the spring 27 downwards. Thereby, the make spring 26 can influence the movable slide 28 so that it executes its movements and reaches its stop against the arresting surface 31 of the guide plate 30. The make spring 26 keeps the movable slide 28 presses against the stop surface 31. The armature 24 can continue its movement until it is arrested by the pole boss 35.

The forces acting on the armature in this indirectly driven coupling in the make state are:

during the first part distance F (see FIG. 3), only the counter directed force (about 100 mN) of the armature spring 25.

During the next distance E, the break state spring 27 (about 300 mN) also acts on the armature opposite to the direction of movement, and the make state, spring 26 (about 150 mN) acts on the armature in the direction of movement, which means that the armature during this distance must overcome a force of about $100+300-150=250$ mN. When the movable slide has been arrested against the stop surface 31, there remains the part distance G of the armature movement. During this part distance G the armature is acted on by the armature spring 25 plus the break state spring 27, i.e. about $100+300=400$ mN.

The construction of the inventive relay is not limited to the use of a leaf spring 26 as the make spring for the fibres. It is also possible to pretension the fibres 19, 20, 21 at the holder 36 so that a biassing spring force occurs in the fibres themselves. The spring 27 will then act with a counter force on one or all of the fibres 19, 20, 21.

By the indirect action on the movable slide described herein the following advantages are afforded:

The slide 28 is acted on by the make state spring 26 immediately when the armature tongue actuates the break state spring 27 since the armature bracket tongue 32 is stiff. This means that the lost motion F can be made short.

The lost motion F can be adjusted by bending the tongue 32.

During the armature travel G the force which is to be overcome is only that of the return force in the armature spring 25 and the release state spring 27.

The lost motion G is adjusted by bending the armature bracket tongue 33.

The armature stroke can be made less, with this indirectly driven coupler than with a direct driven coupler, which requires resilient armature tongue 7.

In the make state, the oscillating system (the slide 28 with its fibres and the spring 27) is disengaged from the armature 24 with its relatively large mass, whereby the damping time for the vibrations occurring at the operation state will be shortened.

In the manufacture of optical fibre relays according to the invention described, the adjustment of the relay function data is facilitated in the following manner:

The armature with mounted armature spring 25 can be checked to assure that it provides the proper force, and, if necessary, it can be adjusted before attachment to the core 23. The break state spring 26, which is mounted on the core 23, can be checked to assure that it provides the proper force and it can also be adjusted, if necessary, before mounting of the slide 28 and the other guides associated with the fibres. The break state spring 27 which is mounted on its holder 40 can also be checked to assure it provides the right force and it can also be adjusted, if necessary, before mounting the holder in the relay. By virtue of the capability of separately adjusting the component springs 25, 26, 27 in the described manner, no operations are needed after the parts of the relay have been fitted in place the the risk of damaging the delicate fibre ends in thus considerably reduced. In respect of the armature 24, the method used for the springs has its counterpart in a measurement check and possible adjustment beforehand of the two adjusting tongues 32 and 33. In order for the movable slide 28 to be guided by a bottom plate 41 in its movement, the fixed fibre holder 36 is provided with two wire springs 37, 38 which apply a force on the slide 28 directed towards the bottom plate 41 and which springs slide in grooves in the slide 28 when the slide 28 moves.

What is claimed is:

1. An optical fiber switch comprising a fixed holder, at least one fixedly mounted fiber on said holder, a slide, at least one movable fiber secured to said slide in facing relation to said fixedly mounted fiber, first and second abutments between which said slide is movable, and means including a magnetically activated armature for displacing said slide to selectively and controllably couple and uncouple said fibers optically, said means including a rigidly clamped first spring acting on said slide to displace the slide from said first abutment to said second abutment, a second spring action on said slide in opposition to said first spring, said second spring being stronger than said first spring, and means rigidly mounted on said armature for diminishing the action of said second spring on said slide, upon activation of said armature, so that said slide is displaced to said second abutment substantially only under the action of said first spring.

2. An optical fiber switch as claimed in claim 1 wherein said means for diminishing the action of said second spring on said slide comprises an armature bracket secured to said armature and including a tongue positioned to engage said second spring to displace said second spring in a direction away from said slide when the armature is activated.

3. An optical fiber switch as claimed in claim 2 wherein said tongue is adjustable by bending to control its engagement with said second spring.

4. An optical fiber switch as claimed in claim 1 wherein said armature is displaceable and includes a tongue for engaging said abutments to determine the extend of displacement of the armature.

5. An optical fiber switch as claimed in claim 4 wherein said tongue is adjustable by bending.

6. An optical fiber switch as claimed in claim 1 wherein at least one of said springs is a leaf spring.

7. An optical fiber switch as claimed in claim 1 comprising guide means for guiding the slide in its movement between said abutments.

8. An optical fiber switch as claimed in claim 7 wherein said guide means includes a guide having a guide surface against which said slide is movable and spring means for urging said slide against said guide surface.

* * * * *